United States Patent
Hong et al.

(10) Patent No.: US 12,485,369 B2
(45) Date of Patent: Dec. 2, 2025

(54) ELECTROCHEMICAL MEMBRANE DEGASSING APPARATUS

(71) Applicant: Korea University Research and Business Foundation, Seoul (KR)

(72) Inventors: Seung-Kwan Hong, Yongin-si (KR); Seon-Kyu Lee, Seoul (KR); Jung-Hyun Kim, Gunpo-si (KR); Yeo-Jin Shin, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 334 days.

(21) Appl. No.: 18/347,001

(22) Filed: Jul. 5, 2023

(65) Prior Publication Data

US 2024/0009595 A1 Jan. 11, 2024

(30) Foreign Application Priority Data

Jul. 5, 2022 (KR) ........................ 10-2022-0082659

(51) Int. Cl.
| | |
|---|---|
| *B01D 53/22* | (2006.01) |
| *B01D 19/00* | (2006.01) |
| *B01D 65/08* | (2006.01) |
| *B01D 69/02* | (2006.01) |
| *C02F 1/20* | (2023.01) |

(Continued)

(52) U.S. Cl.
CPC ..... *B01D 19/0073* (2013.01); *B01D 19/0031* (2013.01); *B01D 65/08* (2013.01); *B01D 69/02* (2013.01); *C02F 1/20* (2013.01); *C02F 1/4602* (2013.01); *C02F 1/4672* (2013.01); *B01D 2321/18* (2013.01); *B01D 2321/22* (2013.01);

(Continued)

(58) Field of Classification Search
CPC ...................... B01D 19/0073; B01D 19/0031; B01D 65/08; B01D 69/02; B01D 2321/18; B01D 2321/22; B01D 2325/26; C02F 1/20; C02F 1/4602; C02F 1/4672; C02F 2101/32; C02F 2305/023

See application file for complete search history.

(56) References Cited

U.S. PATENT DOCUMENTS

| | | | |
|---|---|---|---|
| 2002/0175140 A1* | 11/2002 | Yun ................... | H01L 21/76838 216/2 |
| 2006/0133004 A1* | 6/2006 | Yamamura .......... | H01L 21/6831 361/234 |

(Continued)

*Primary Examiner* — Anthony R Shumate
(74) *Attorney, Agent, or Firm* — NSIP Law

(57) ABSTRACT

Disclosure relates to an electrochemical membrane degassing apparatus including a liquid channel in which raw water flows, a gaseous channel in which gas degassed from the raw water flows, a gas separation membrane allowing gas in the raw water to be moved to the gaseous channel, a surface modification layer formed at the gas separation membrane, and a power supply unit applying power to the surface modification layer, and selectively operated in either of a first process mode applying a low voltage power and a second process mode applying a high voltage power, wherein in the first process mode, an electrostatic repulsive force is generated between the surface modification layer and organic particles, and in the second process mode, a radical is generated, and the organic particles is oxidized by the radical. Accordingly, the efficiency of membrane degassing can be improved and membrane contamination can be prevented.

6 Claims, 10 Drawing Sheets

(51) Int. Cl.
*C02F 1/46* (2023.01)
*C02F 1/467* (2023.01)
*C02F 101/32* (2006.01)

(52) U.S. Cl.
CPC ...... *B01D 2325/26* (2013.01); *C02F 2101/32* (2013.01); *C02F 2305/023* (2013.01)

(56) References Cited

U.S. PATENT DOCUMENTS

| | | | |
|---|---|---|---|
| 2008/0047686 A1* | 2/2008 | Reinders | F24F 1/0073 |
| | | | 62/99 |
| 2009/0309180 A1* | 12/2009 | Yamagata | G06V 40/1306 |
| | | | 257/435 |
| 2010/0143811 A1* | 6/2010 | Brimblecombe | B01J 35/39 |
| | | | 29/829 |
| 2010/0294644 A1* | 11/2010 | Zebuhr | F28F 9/0075 |
| | | | 165/165 |
| 2013/0323588 A1* | 12/2013 | Kajiwara | H01G 11/38 |
| | | | 429/211 |
| 2015/0187823 A1* | 7/2015 | Miyairi | H10D 86/423 |
| | | | 257/43 |
| 2016/0096745 A1* | 4/2016 | Peterson | C02F 1/20 |
| | | | 210/750 |
| 2017/0038889 A1* | 2/2017 | Fujino | C23C 14/35 |
| 2018/0009681 A1* | 1/2018 | Cam | B03C 11/00 |
| 2019/0374911 A1* | 12/2019 | Fujimura | H01L 21/02057 |
| 2020/0360862 A1* | 11/2020 | Kamimura | B01D 61/147 |

* cited by examiner

[FIG. 1]
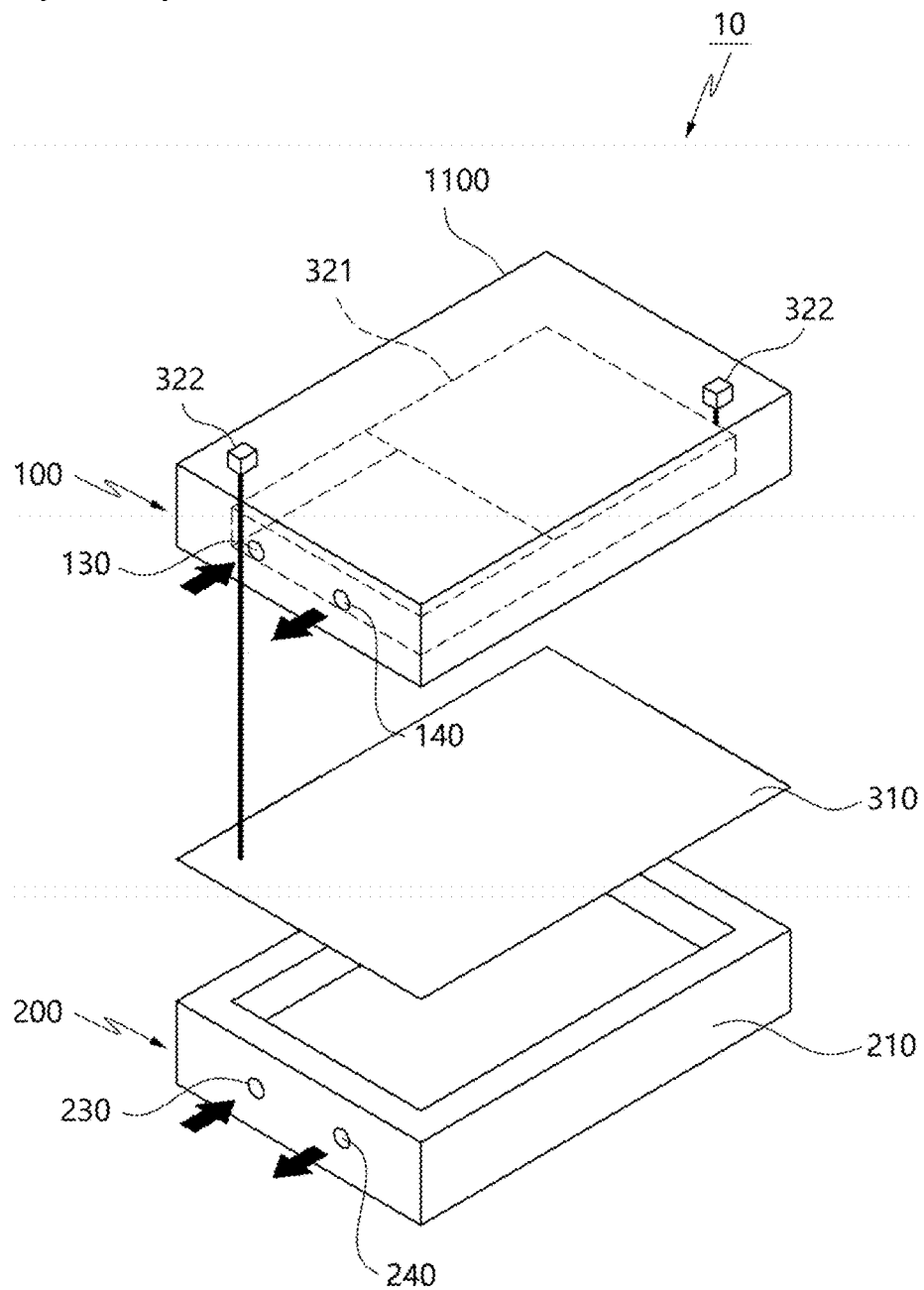

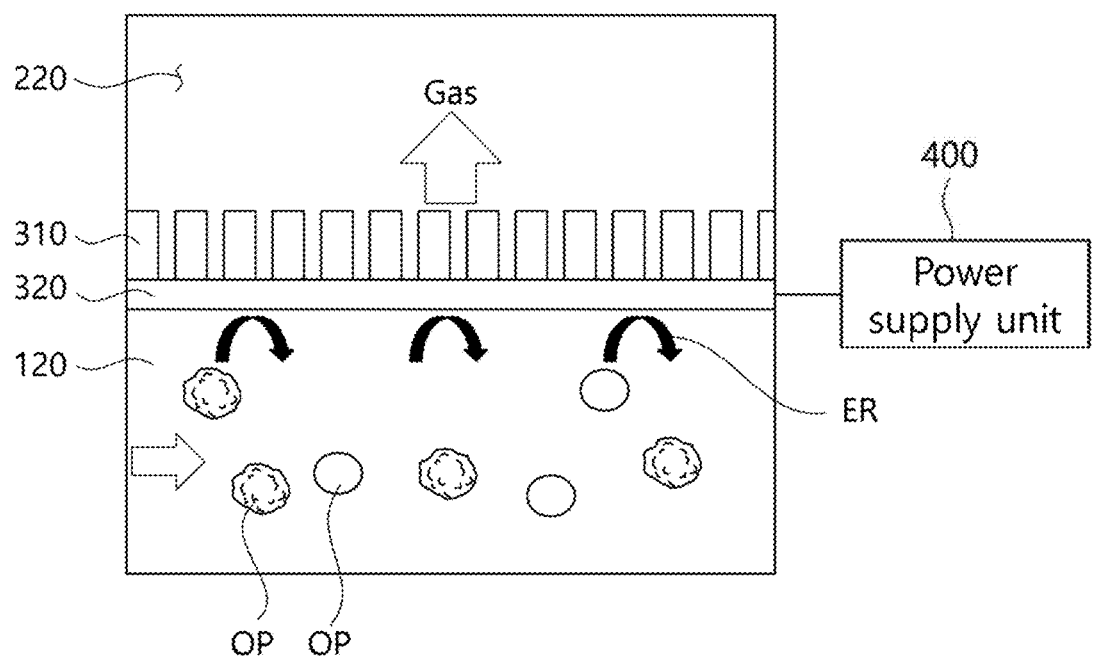
[FIG. 2]

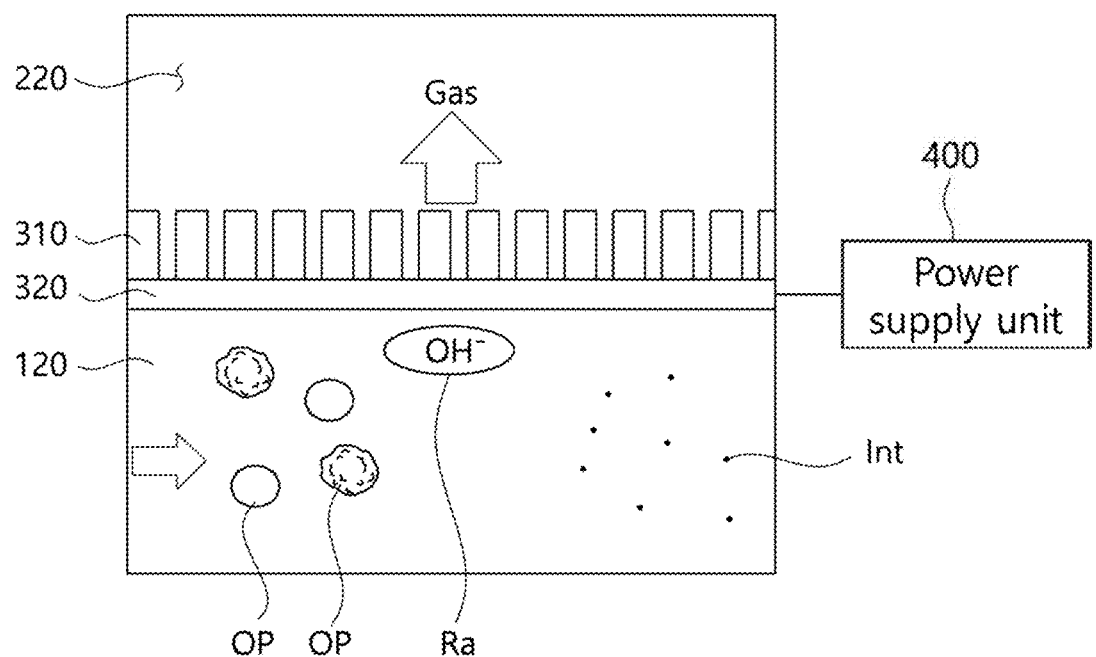
[FIG. 3]

[FIG. 4]
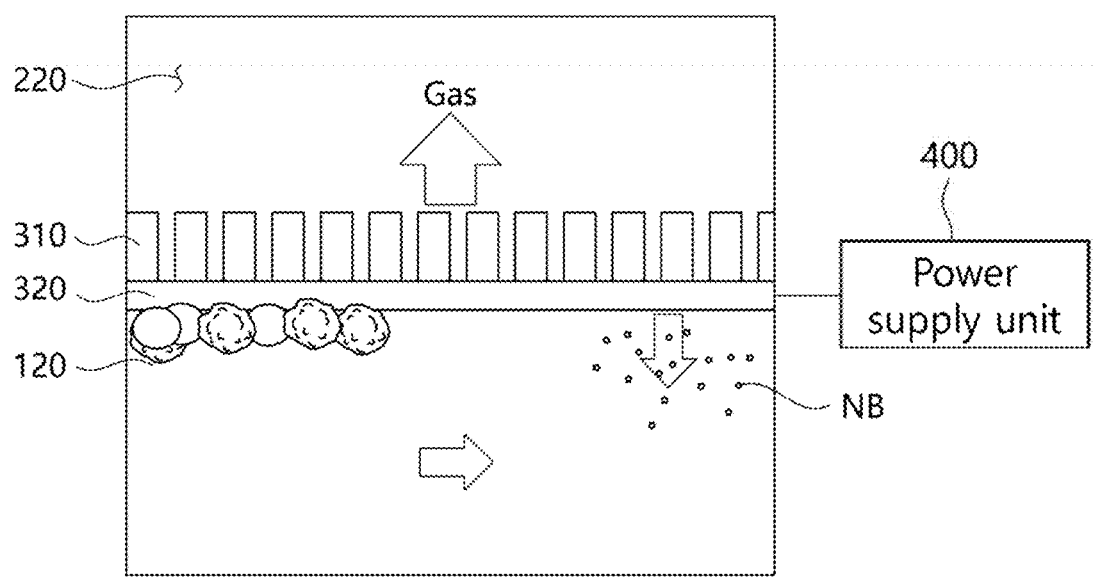

[FIG. 5]
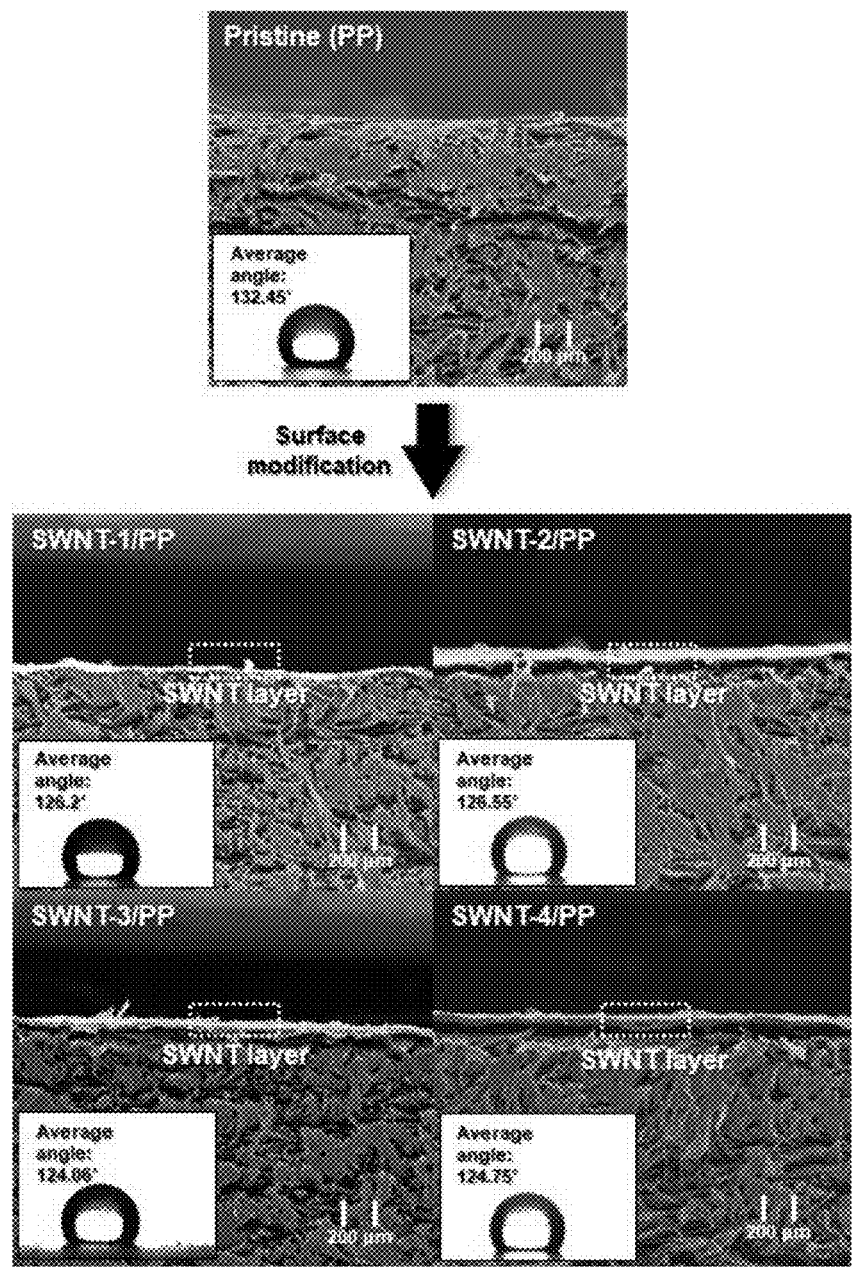

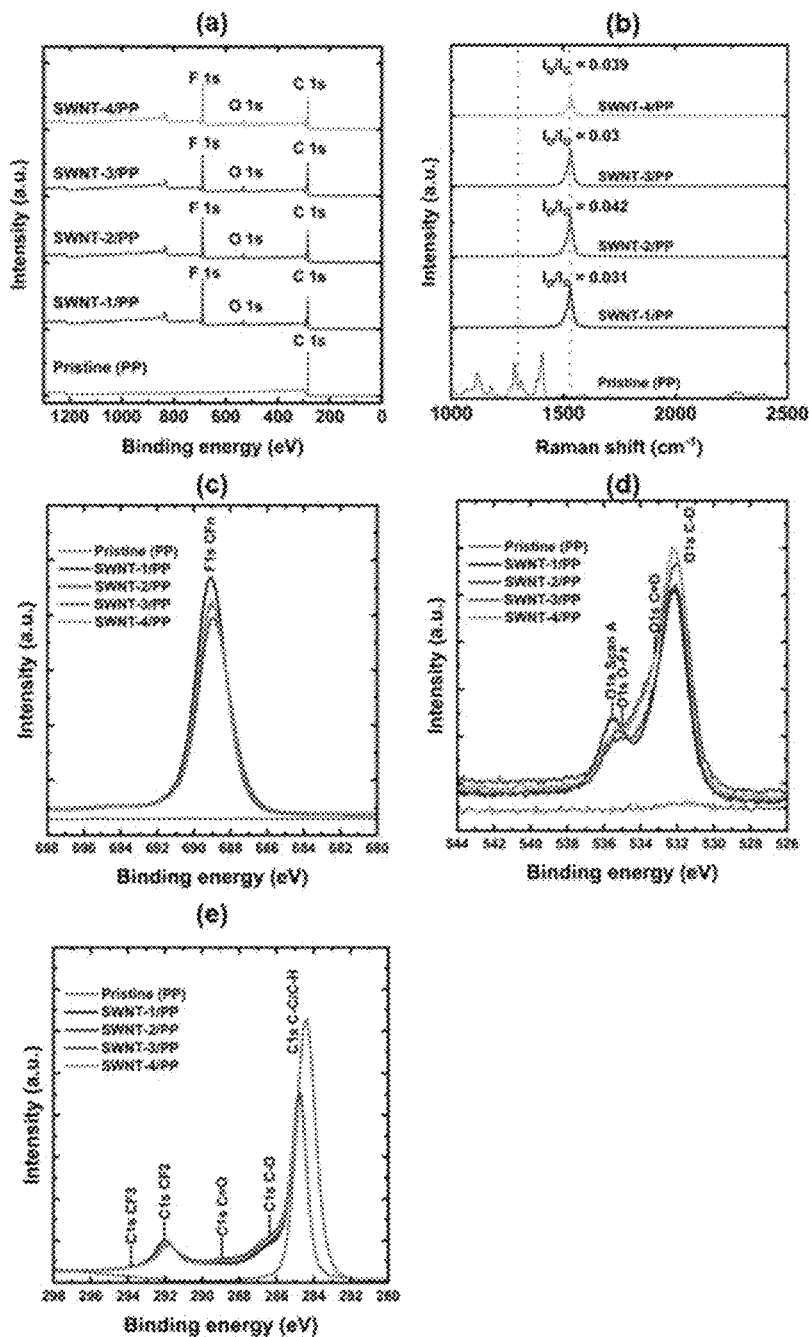
[FIG. 6]

[FIG. 7]
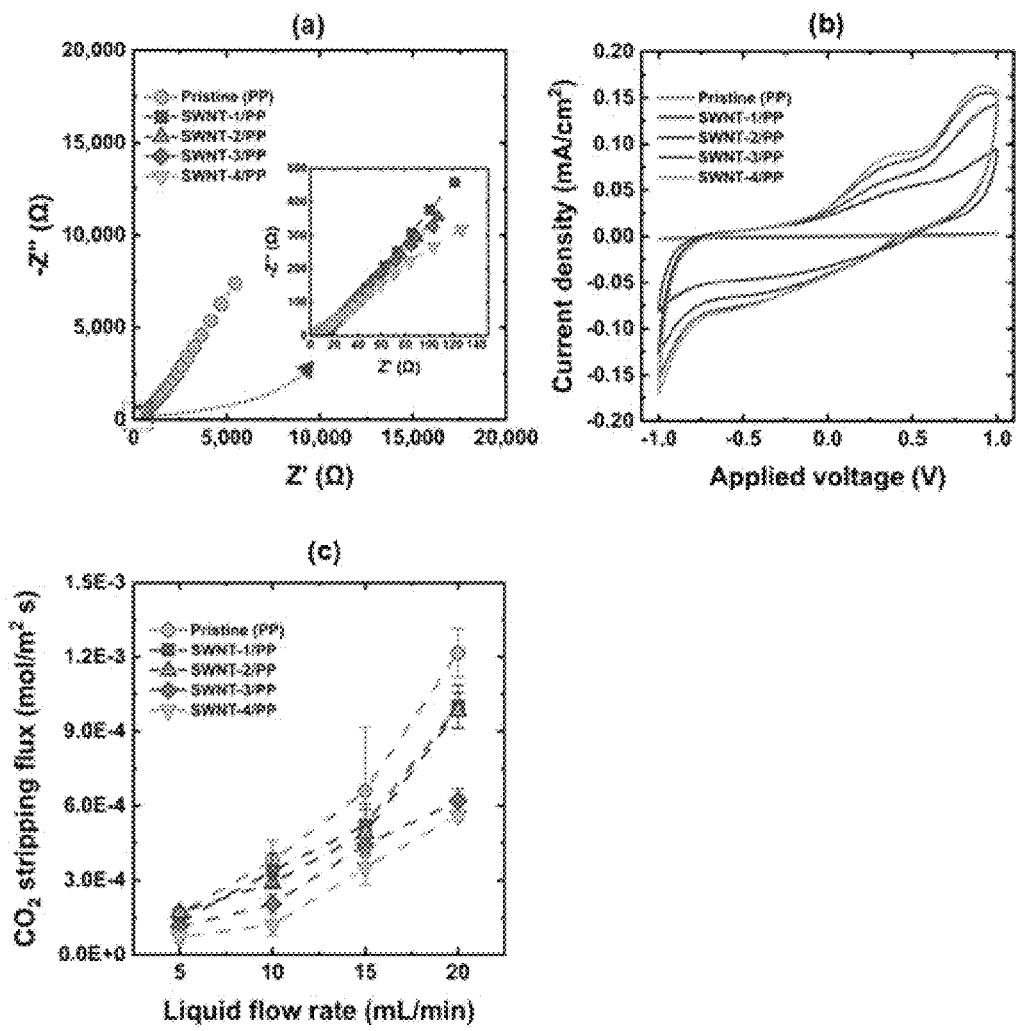

[FIG. 8]
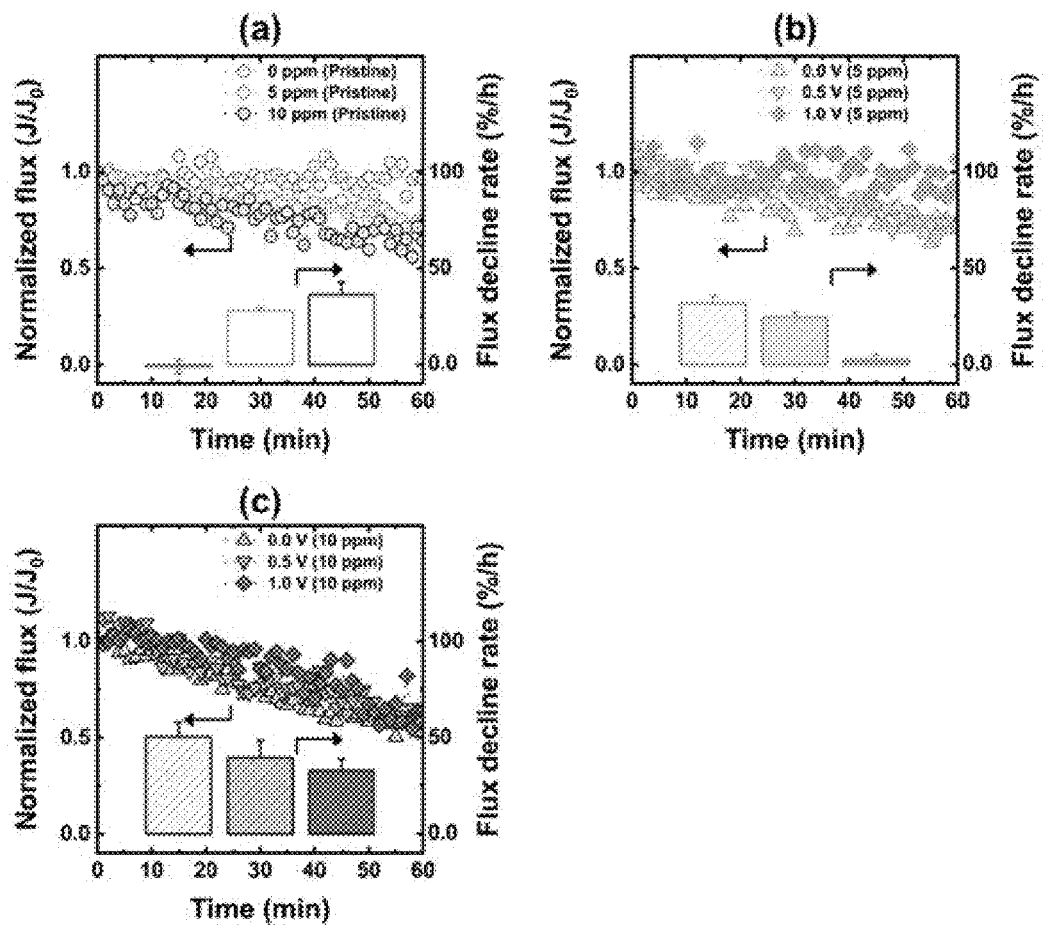

[FIG. 9]
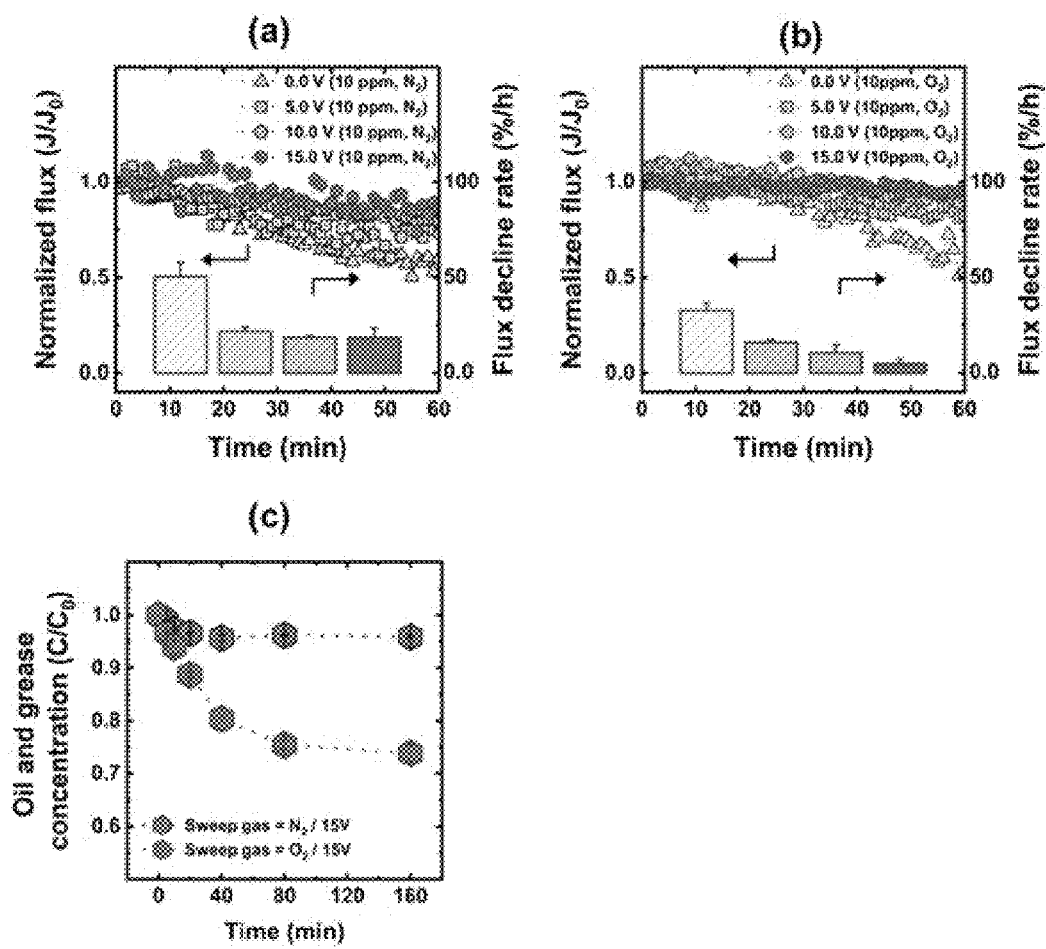

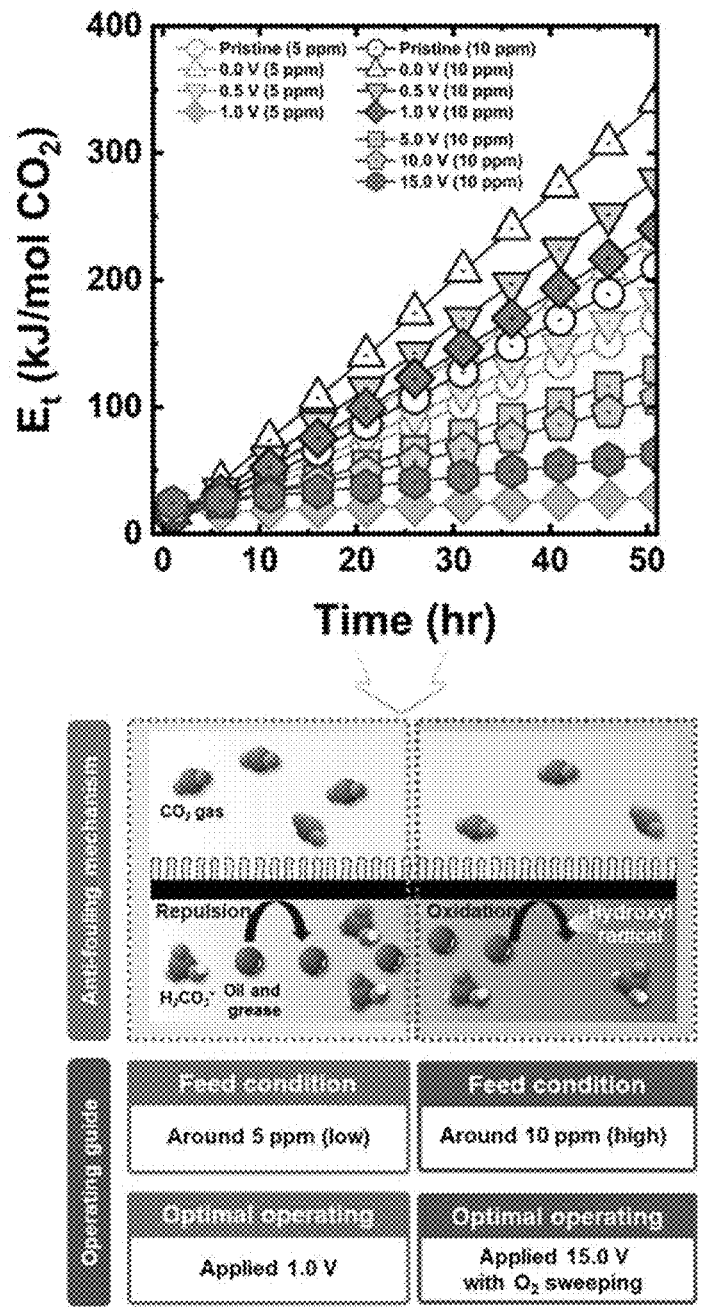
[FIG. 10]

ELECTROCHEMICAL MEMBRANE DEGASSING APPARATUS

CROSS REFERENCE TO RELATED APPLICATIONS

The present application claims priority to Korean Patent Application No. 10-2022-0082659, filed Jul. 5, 2022, the entire contents of which is incorporated herein for all purposes by this reference.

BACKGROUND

1. Technical Field

The present disclosure relates to an electrochemical membrane degassing apparatus and, more particularly, to an electrochemical membrane degassing apparatus to remove gaseous substances in raw water.

2. Description of the Related Art

In recent, water treatment fields such as water purification or wastewater treatment and seawater desalination in preparation for water pollution and water shortage have become one of the important future technologies.

Such a water treatment process generally includes a membrane degassing process to provide various gas components contained in raw water. For example, an ultra-pure water process includes a treatment process of low concentration $CO_2$ gas or $O_2$ gas in raw water, and a treatment process of high concentration of $CO_2$ exists in a carbon capture & storage (CCS) process. Furthermore, a treatment process of $CH_4$ gas or $HN_3$ gas from methane wastewater or ammonia wastewater exists in an ammonia recovery process.

In general, in the membrane degassing process, a gas separation membrane is widely used to separate gas components from liquid raw water. An existing degassing tower process has problems such as small installation area, low efficiency, and high energy consumption. Through the introduction of the gas separation membrane, a gas-fluid contact surface is improved compared to the same installation area, thereby correcting disadvantages of the degassing tower process in terms of the efficiency and the energy consumption.

However, when the raw water is heated in the membrane degassing process, the gas separation membrane is wetted, and organic particles in the raw water causes membrane contamination of the gas separation membrane, which is a problem.

Therefore, degassing performance improvement should be achieved in a way other than the raw water heating method, and a method to control membrane contamination through the organic particles in the raw water in the membrane degassing process is desired.

SUMMARY

Accordingly, the present disclosure has been made keeping in mind the above problems occurring in the related art, and the present disclosure is intended to provide an electrochemical membrane degassing apparatus capable of enhancing the efficiency of membrane degassing by improving mobility of dissolved gas in raw water even without heating the raw water, and also capable of preventing membrane contamination due to organic particles in the raw water.

According to the present disclosure, the present disclosure is intended to provide an electrochemical membrane degassing apparatus including: a liquid channel in which raw water may flow, a gaseous channel in which gas degassed from the raw water may flow, a gas separation membrane disposed between the liquid channel and the gaseous channel, and allowing gas in the raw water flowing in the liquid channel to be moved to the gaseous channel, a surface modification layer formed on one side surface of the gas separation membrane and made of an electroconductive material, and a power supply unit applying power to the surface modification layer, and selectively operated in either of a first process mode in which a low voltage power may be applied, and a second process mode in which a high voltage power may be applied, wherein in the first process mode, as the low voltage power may be applied, an electrostatic repulsive force may be generated between the surface modification layer and organic particles in the raw water; and in the second process mode, as the high voltage power is applied, a radical may be generated, and the organic particles in the raw water may be oxidized by the radical.

In the second process mode, as the high voltage power is applied, microbubbles may be generated in the surface modification layer and thus matter absorbed by at least one of the surface modification layer and the gas separation membrane may be removed.

The surface modification layer may be made of one of or a combination of at least two or more of a conductive carbon-based material, metal-organic frameworks, and conductive polymers.

The carbon-based material may include one of or a combination of at least two or more of activated carbon, carbon nanotubes, and graphene.

In the second process mode, the radical may be generated by an ionic substance in the raw water.

In the second process mode, a gaseous by-product generated in a process of oxidation of the organic particles may pass through the gas separation membrane to be moved to the gaseous channel.

According to the above-described structure, in the present disclosure, an electric field is generated on the surface of the surface modification layer 320, and ions and dissolved gas in the raw water increases in kinetic energy under the influence of the electric field, and the effect of enhancing mass convection occurs. The effect of enhancing mass convection increases the efficiency of degassing of dissolved gas, and the electrochemical reaction efficiency.

Furthermore, as a low voltage power is applied, an electrostatic repulsive force generated on a surface of the surface modification layer can prevent the organic particles from being absorbed.

Furthermore, as a high voltage power is applied, a radical generated by a dissolved ionic substance oxidizes the organic particles, and the organic particles can be directly treated.

Furthermore, as the high voltage power is applied, the microbubbles generated on a surface of the surface modification layer can allow the organic particles to be removed even when being absorbed to the surface modification layer.

BRIEF DESCRIPTION OF THE DRAWINGS

FIG. 1 is a view showing an example of configuration of an electrochemical membrane degassing apparatus according to an embodiment of the present disclosure; and FIGS. 2 to 4 are views showing an operation process of the electrochemical membrane degassing apparatus according to the embodiment of the present disclosure; and FIGS. 5 to 10 are views for explaining effects of the electrochemical membrane degassing apparatus according to the embodiment of the present disclosure.

DETAILED DESCRIPTION

The above and other objects, features, and advantages of embodiments of the present disclosure, and a method of achieving them will be more clearly understood with reference to the embodiments described below in detail in conjunction with the accompanying drawings. However, the present disclosure is not limited to the following embodiments, and can be embodied in various forms different from each other, and embodiments of the present disclosure are presented to make complete disclosure of the present disclosure and help those who are ordinarily skilled in the art to which the present disclosure belongs understand the spirit and scope of the present disclosure. The present disclosure is only defined by the scope of the claims. The same reference numerals are used throughout the specification to designate the same or similar components.

This work was supported by the National Research Foundation of Korea (NRF) grant funded by the Korea government (MSIT) (No. NRF-2021R1A5A1032433).

Also, this work was supported by the National Research Foundation of Korea (NRF) grant funded by the Korea government (MSIT). (Project No. 2022M3J7A1066428)

Hereinbelow, embodiments of the present disclosure will be described in detail with reference to accompanying drawings.

FIG. 1 is a view showing an example of configuration of an electrochemical membrane degassing apparatus 10 according to an embodiment of the present disclosure.

Referring to FIG. 1, according to the embodiment of the present disclosure, the electrochemical membrane degassing apparatus 10 may include a liquid flow part 100, a gaseous flow part 200, a gas separation membrane 310, and a surface modification layer 320.

According to the embodiment of the present disclosure, as shown in FIG. 2, a liquid channel 120 may be formed in the liquid flow part 100 for raw water to flow therein.

According to the embodiment of the present disclosure, the liquid flow part 100 may include a liquid flow main body 110 in which the liquid channel 120 is formed. The liquid flow main body 110 may include a liquid inlet 130 into which the raw water is introduced, and a liquid outlet 140 through which the raw water introduced through the liquid inlet 130 is discharged outwards of the liquid flow main body 110 after flowing in the liquid channel 120.

According to the embodiment of the present disclosure, the liquid flow part 100 may include an electrode member 321 installed inside the liquid flow main body 110, and description thereof will be described below.

According to the embodiment of the present disclosure, a gaseous channel 220 may be formed in the gaseous flow part 200 as shown in FIG. 2. Gas degassed from the liquid channel 120 is introduced into the gaseous channel 220 and flows therein. The embodiment of the present disclosure illustrates that the gaseous channel 220 is maintained in a vacuum state or nitrogen gas or air flows therein.

According to the embodiment or the present disclosure, the gaseous flow part 200 may include a gaseous flow main body 210 in which the gaseous channel 220 is formed. The gaseous flow main body 210 may include a gaseous inlet 230 and a gaseous outlet 240.

At this point, vacuum is applied to the gaseous inlet 230 or nitrogen gas or air may be introduced thereinto. Together with nitrogen gas or air, the gas degassed from the liquid channel 120 and introduced into the gaseous channel 220 may be discharged through the gaseous outlet 240.

Meanwhile, according to the embodiment of the present disclosure, the gas separation membrane 310 may be disposed between the liquid channel 120 and the gaseous channel 220. Furthermore, the gas separation membrane 310 allows the gas in the raw water that flows in the liquid channel 120 to flow in the gaseous channel 220, and on the other hand, the gas separation membrane 310 prevents a flow other than the gas, thereby degassing the gas in the raw water to the gaseous channel 220.

The embodiment of the present disclosure illustrates that the gas separation membrane 310 has hydrophobicity and is made of a polymer-based separation membrane. However, other gas separation membranes 310 that are applicable to membrane degassing may be also applied.

According to the embodiment of the present disclosure, the surface modification layer 320 may be formed on one side surface of the gas separation membrane 310. The embodiment of the present disclosure illustrates that the surface modification layer 320 is formed on a surface on the side of the liquid channel 120 among surfaces on opposite sides of the gas separation membrane 310.

At this point, the surface modification layer 320 is made of a conductive material, and the embodiment of the present disclosure illustrates that the surface modification layer 320 is made of one of or a combination of at least two or more of a conductive carbon-based material, a metal-organic frameworks (MOFs), and a conductive polymers (CPs).

As the embodiment, the carbon-based material may include one of or a combination of at least two or more of activated carbon, carbon nanotubes, and graphene.

At this point, the surface modification layer 320 may be formed by coating a surface of the gas separation membrane 310 with a conductive material.

Meanwhile, according to the embodiment of the present disclosure, the electrochemical membrane degassing apparatus 10 may include a power supply unit 400.

According to the embodiment of the present disclosure, the power supply unit 400 supplies power to a surface modification membrane through the electrode member 321 installed in a main body of the liquid channel 120, and the surface modification layer 320. At this point, each of the electrode member 321 and the surface modification layer 320 may be connected to the power supply unit 400 through an electrode terminal 322.

Through this structure, as power is applied, an electric field is generated on a surface of the surface modification layer 320, and ions and dissolved gas in the raw water are increased in kinetic energy under the influence of the electric field, and the effect of enhancing mass convection occurs. The effect of enhancing mass convection increases the efficiency of degassing of dissolved gas, and the electrochemical reaction efficiency to be described below, so that the efficiency of the electrochemical membrane degassing apparatus 10 according to the present disclosure can be enhanced.

Meanwhile, according to the embodiment of the present disclosure, the power supply unit 400 may be selectively operated in either of a first process mode in which low voltage power is applied to the surface modification layer 320 and a second process mode in which high voltage power is applied thereto.

The embodiment of the present disclosure illustrates that when the power supply unit 400 supplies the low voltage power in the first process mode, the low voltage power less than or equal to 1.23V is supplied as an embodiment.

In the first process mode in which the low voltage power is applied as described above, as shown in FIG. 2, an electrostatic repulsive force ER is generated between the surface modification layer 320 and organic particles OP in the raw water. The electrostatic repulsive force ER prevents the organic particles OP in the raw water from being adsorbed to the surface modification layer 320 or the gas separation membrane 310, so that membrane contamination can be prevented.

In describing the surface repulsive force between the surface modification layer 320 and the organic particles OP, when a voltage is applied according to zeta potential of the organic particles OP, the electrostatic repulsive force expressed by [Equation 1] is generated.

$$U_{EL}(h) = \pi \varepsilon_0 \varepsilon_r a_c \left[ 2\xi_m \xi_p \ln\left(\frac{1+e^{-\kappa h}}{1-e^{+\kappa h}}\right) + (\xi_m^2 + \xi_p^2)\ln(1-e^{-2\kappa h}) \right] \quad \text{[Equation 1]}$$

At this point, h is a distance between the surface modification layer 320 and the organic particles OP, m is a membrane surface, p is a surface of each organic particle OP, ε is dielectric permittivity, κ is inverse Debye screening length, and ξ is potential.

Meanwhile, in the second process mode, as shown in FIG. 3, a radical Ra may be generated as the high voltage power is applied. Furthermore, by the generated radical Ra, oxidation treatment is performed with respect to the organic particles OP in the raw water, and the organic particles OP in the raw water may be removed. The embodiment of the present disclosure illustrates that the high voltage power higher than or equal to 1.23V is applied in the second process mode.

In the raw water, an ionic substance, for example, dissolved oxygen, etc. may exist, and the radical Ra may be generated by a chemical reaction according to application of the high voltage power. A reaction formula of generation of the radical Ra as described above is shown in a following example.

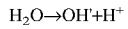

$H_2O \rightarrow OH^{\cdot} + H^+$

$OH^- \rightarrow OH^{\cdot}$

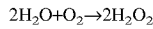

$2H_2O + O_2 \rightarrow 2H_2O_2$

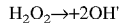

$H_2O_2 \rightarrow \cdot + 2OH^{\cdot}$

At this point, a gaseous by-product such as nitrogen and carbon dioxide generated in the oxidation process of the organic particles OP by the radical Ra is degassed together with the dissolved gas through the gas separation membrane 310 to be treatable. In FIG. 3, Int is an intermediate by-products of the solid phase generated in the oxidation process of the organic particles OP.

Meanwhile, in the second process mode, according to the high voltage power is applied, as shown in FIG. 4, microbubbles NB may be generated from the surface modification layer 320. The microbubbles NB are sprayed from the surface modification layer 320 towards the liquid channel 120 to remove the matter absorbed to the surface modification layer 320 or the gas separation membrane 310, for example, remove the organic particles OP.

Accordingly, membrane contamination is prevented efficiently when being operated in a process in the first process mode or in the second process mode, so that an active effect in a replacement period of the gas separation membrane 310 is provided. Furthermore, since membrane contamination is reduced or decontaminated, continuity of operational performance can be ensured.

Hereinbelow, effects of the electrochemical membrane degassing apparatus 10 according to the embodiment of the present disclosure will be described in detail.

SWNT (Single-walled carbon nanotube) which forms the surface modification layer 320 are hydrophobic conductive materials that can improve CO2 stripping by ECMC (Electrically conductive membrane contactor). The morphological and electrical properties of the SWNT coating on the surface of PP (Polypropylene) which forms the gas separation membrane 310 is investigated using various analyses.

Surface modification resulted in the coating of the pristine membrane with SWNT layer. The membrane surface characteristics are investigated via morphological and chemical structure analyses. Field-emission scanning electron microscopy (FE-SEM) is used to visualize the membrane surfaces and observe the SWNT layers. The top surface of the ECM containing the SWNT layers, and the contact angles of the membrane surfaces are shown in FIG. 4.

However, the FE-SEM images are insufficient to confirm the effects of surface modification, and the chemical properties of the surface were analyzed using x-ray photoelectron spectroscopy (XPS) and Raman spectroscopy.

The XPS results correspond to the chemical structure of the membrane surface. FIG. 6 shows the dominant peaks of the pristine membrane and ECMs, which are the F1s, O1s, and C1s core electron spectra. The C—C/C—H peaks of the pristine membrane and ECMs are detected at 284.68 eV in the C1s core electron spectra, but $CF_3$, $CF_2$, C=O, and C—O peaks are only observed in the ECMs. Similarly, $CF_n$, C—O, and C=O peaks in the F1s and O1s core electron spectra were detected in the ECMs.

Raman spectroscopy confirms the successful incorporation of the SWNT layers into the pristine membrane. The dominant peaks of the ECMs corresponded to the G-band located at 1573 cm$^{-1}$. The ratio of the D-band and G-band peak intensities, namely $I_D/I_G$, is commonly used to determine structural defects in carbon-based materials. The $I_D/I_G$ ratio is approximately 0.5, indicating that no structural defects are observed in any of the surface modifications. Therefore, it is confirmed that stable ECMs with modified surfaces are manufactured, based on the analyses of the morphology and chemical structure.

Owing to surface modification, SWNT-2/PP exhibits superior conductivity and stripping performance. To determine the best ECM, the electrochemical impedance spectroscopy (EIS) and cyclic voltammetry (CV) curves are compared with the $CO_2$ stripping performance.

The charge transfer resistance and electrically active surface area are associated with the EIS and CV curves, respectively. The coated membrane shows a dramatic increase in electrical conductivity compared to the pristine membrane at the same frequency, but there are no significant differences in resistance between the coated membranes (FIG. 7(a)). Furthermore, the CV values significantly increased when 2-layered ECMs are used; however, the addition of more layers did not result in a notable change (FIG. 7(b)).

The experimental data for pristine membrane shows that when the liquid flow rate increases from 5 to 20 mL/min, the $CO_2$ stripping flux increased from $1.67 \times 10^{-4}$ to $1.22 \times 10^{-3}$ mol m$^{-2}$ s$^{-1}$.

However, the coated membrane has smaller pores due to the SWNT layers, resulting in decreased $CO_2$ stripping flux. SWNT-1/PP and SWNT-2/PP exhibit similar stripping performance, but the $CO_2$ stripping flux of SWNT-3/PP and SWNT-4/PP is more than 50% lower than that of SWNT-1/PP (FIG. 7(c)). The ECM should be selected according to both its electrochemical performance and $CO_2$ stripping flux. ECMs with more than three layers do not achieve high $CO_2$ stripping flux, and single-layered ECMs exhibited low electrochemical performance. Therefore, the SWNT-2/PP membrane was used in the embodiment of the present disclosure, which maintained approximately 80% of the $CO_2$ stripping flux while improving the electrochemical performance.

The embodiment of the present disclosure demonstrates that the structural stability of ECMs can be achieved through surface modification. A comparison of the electrical conductivities and $CO_2$ stripping performances of the ECMs led to the selection of SWNT-2/PP as the best membrane for $CO_2$ stripping.

With regard to ECMC operation under non-faradaic conditions for fouling mitigation, organic repulsion effectively reduces membrane fouling on membrane surfaces via electrostatic interaction forces. According to the Derjaguin-Landau-Verwey-Overbeek theory, negatively charging a membrane prevents the attachment of negatively charged oil and grease to its surface. Therefore, the experiments are performed under non-faradaic conditions ($\leq 1.0$ V).

First, the effect of oil and grease concentration on performance is investigated using a pristine membrane. $CO_2$ stripping with the pristine catalyst proceeds for 1 h with oil and grease. A pristine membrane without oil and grease shows no significant change in $CO_2$ stripping performance, but the performance decrease dramatically by approximately 30% and 40% at concentrations of 5 and 10 ppm, respectively (FIG. 8(a)). Therefore, the pristine membrane is highly vulnerable to the deleterious effects of oil and grease.

The effects of electrostatic repulsion are investigated at different applied voltages and organic matter concentrations, the effect on the influent with 5 ppm of oil and grease is shown in FIG. 8(b). The normalized $CO_2$ stripping flux decreases from 1.0 to 0.6 after 1 h under no applied voltage. At a voltage of 0.5V, the normalized flux decreases to approximately 0.75 after 1 h, and at 1.0V, fouling is significantly mitigated after 1 h, and performance is not affected.

To confirm the dominant antifouling mechanism, the oil and grease concentrations of the module inlet/outlet are analyzed using TOC analysis (TOC V-CSH, Shimadzu Corp., Japan). Under non-faradaic conditions (0.0-1.0V) and concentrations of oil and grease maintains above 97.2%, there is no significant changes. Therefore, the $CO_2$ stripping performance is maintained without a significant difference in the concentration of organic matter. This result shows that fouling was prevented by electrostatic repulsive forces between the membrane surface and organic matter.

However, at high concentrations of oil and grease (10 ppm), no significant antifouling effect is observed at an applied voltage of 1.0V or less (FIG. 8(c)). The flux decline rate increases from 0 to 0.36%/h as the concentration of oil and grease increased from 0 to 10 ppm in the pristine membrane. Applying a voltage of 1.0V decreases the flux decline rate to 0.03%/h with a low concentration of 5 ppm but is only able to reduce it to 0.33%/h with a high concentration of 10 ppm.

The electrostatic repulsive force can prevent membrane fouling by oil and grease. This method reduces the fouling by 35% within 60 min and maintains a stable stripping performance. However, stripping performance is not maintained with high concentrations of oil and grease. Therefore, the strategy of an operation that can maintain the $CO_2$ stripping performance even at high concentrations of oil and grease is essential.

With regard to ECMC operation under faradaic conditions for fouling mitigation, to control high concentration pollutant inflows, a method for removing organic matter should be considered. Electrochemical oxidation is commonly used to remove organic matter, and the corresponding reaction can be implemented in this membrane module.

A well-known hydroxyl radical oxidant can be generated by applying a voltage above 1.23V. Hence, hydroxyl radicals are expected to remove oil and grease and enhance antifouling performance.

To investigate the anti-fouling performance at high concentrations of pollutants, experiments are conducted by applying a relatively high voltage.

FIG. 9(a) shows the normalized flux between applied voltages of 0.0V to 15.0V. The operating range of ECMC and membrane destruction was observed at 20.0V. However, although the anti-fouling performance increases as the applied voltage increased, the performance degradation is approximately 20% even at 15.0V. Further, the applied voltage increases from 0.0V to 15.0V, and the normalized concentrations of oil and grease are in the range of 0.99-0.975. Hence, anti-fouling performance is not improved by organic oxidation. The production of bubbles from the membrane surface and electrode is closely associated with fouling mitigation. At a redox potential above 1.23V, hydrogen and oxygen gases are generated at the cathode and anode via hydrolysis. Therefore, the nano-bubbling of oxygen and hydrogen by electrolysis mitigates fouling.

To enhance both the efficiency of oil and grease removal and the anti-fouling performance, $O_2$ is employed as a sweep gas. $O_2$ in the gas phase dissolves in the liquid phase due to the difference in partial pressure, generating hydroxyl radicals via electrochemical activation which can improve the anti-fouling performance by removing oil and grease.

The antifouling performance increased significantly when $O_2$, is used as a sweep gas, as shown in FIG. 9(b). The applied voltage increases from 0.0 to 15.0V, and the normalized flux increases from 0.6 to 0.96. Applying $O_2$ as a sweep gas, compared to $N_2$, significantly decreases the flux decline rate to approximately 0.05%/h and greatly mitigates fouling with high concentrations of oil and grease done at a voltage of 15.0V. Furthermore, oil and grease removal efficiencies are 2.16%, 5.5%, 5.86%, and 8.33%, respectively. Hence, compared to $N_2$, $O_2$ as a sweep gas reduces the flux decline rate by 3.84 times through electrochemical oxidation. The normalized concentrations of oil and grease are compared with those of the sweep gases under the best operating conditions (closed-loop system), as shown in FIG. 9(c). Using $N_2$ as a sweep gas decreased oil and grease concentrations by 4.23% over 160 min. However, the removal efficiency of $O_2$ is 6.2 times higher than that of $N_2$.

Therefore, the $O_2$ sweep-gas mode is more effective than the $N_2$ sweep-gas mode in mitigating fouling with high concentrations of oil and grease. In conclusion, the high concentration of pollutant inflow can be responed to the relatively high applied voltage, which maintained the 80%

$CO_2$ stripping flux for 1 h. However, electrochemical oxidation did not occur in $N_2$ sweep gas mode. To achieve high antifouling performance under highly contaminated conditions, the $O_2$ sweep gas mode shows better performance than the $N_2$ sweep gas mode.

To evaluate the applicability of the ECMC, we compared its energy consumption under different conditions. The membrane contact area is scaled to 100 $m^2$, which corresponds to the membrane contact area used in practical applications. Furthermore, the real $CO_2$ stripping process is operated in the air combination mode, assuming that the airflow rate and vacuum pressure are equivalent to those in the $N_2$ sweep gas mode in terms of performance.

First, the total energy consumption during CO2 stripping using both the pristine membrane and ECMC is compared (FIG. 10). With 5 ppm of oil and grease, the total energy consumption of the pristine membrane increases significantly from 13.4 to 163.8 kJ/mol $CO_2$ for 50 h. In the electrostatic repulsion experiments, no significant change occurred at 0.5V. However, a voltage of 1.0V resulted in a significant fouling mitigation effect and a reduction in total energy consumption to 28.6 kJ/mol $CO_2$ which was approximately six times lower than that with the pristine membrane. Similarly, in the case of inflows with 10 ppm of oil and grease, the total energy consumption of the pristine membrane increases to 205.47 kJ/mol $CO_2$, which significantly reduced the efficiency of the stripping process. Under low-voltage conditions, the total energy consumption increased, whereas when a voltage of 5.0V or higher was applied, the energy consumption decreased. In particular, in the $O_2$ seep gas mode at 15.0V, the initial energy consumption was the highest, but after 50 h, it had the lowest energy consumption (62.5 kJ/mol $CO_2$) among the high-concentration conditions.

The optimal conditions for low and high concentrations of oil and grease are derived by comparing the total energy consumption. At low oil and grease concentrations, efficient mitigation of fouling can be achieved through electrostatic repulsion. However, at high concentrations, electrostatic repulsion is not as effective and even increases the total energy consumption per stripped $CO_2$. In this case, the $O_2$ sweep gas mode with a voltage of 15.0V is the most efficient method in the long term, although the initial total energy consumption was high.

Therefore, the ECMC addresses the conventional fouling challenge and improves the feasibility of CCUS processes. Furthermore, ECMC shows lower energy consumption compared to the average (57-158.4 kJ/mol $CO_2$) consumption by thermal-based column strippers.

However, high total energy consumption is still required to mitigate fouling in high concentration oil and grease. This issue can be addressed through the development of catalysts and highly conductive membrane surfaces.

Although the embodiments of the present disclosure have been disclosed for illustrative purposes, those who are ordinarily skilled in the art to which the present disclosure belongs will appreciate that the embodiments can be modified without departing from the scope and sprit of the present disclosure. The patent right of the present disclosure should be defined by the accompanying claims and equivalents thereof.

| DESCRIPTIONS FOR THE REFERENCE NUMBER OF THE FIGURES | |
| --- | --- |
| 10: electrochemical membrane degassing apparatus | |
| 100: liguid channel | 110: liquid flow main body |
| 120: liquid channel | 130: liquid inlet |
| 140: liquid outlet | 200: gaseous flow part |
| 210: gaseous flow main body | |
| 220: gaseous channel | 230: gaseous inlet |
| 240: gaseous outlet | |
| 310: gas separation membrane | |
| 320: surface modification layer | |
| 321: electrode member | 322: electrode terminal |

The invention claimed is:

1. An electrochemical membrane degassing apparatus comprising:
   a liquid channel in which raw water flows,
   a gaseous channel in which gas degassed from the raw water flows,
   a gas separation membrane disposed between the liquid channel and the gaseous channel, and allowing gas in the raw water flowing in the liquid channel to be moved to the gaseous channel,
   a surface modification layer formed on one side surface of the gas separation membrane and made of an electro-conductive material, and
   a power supply unit applying power to the surface modification layer, and selectively operated in either of a first process mode in which a low voltage power is applied, and a second process mode in which a high voltage power is applied,
   wherein in the first process mode, as the low voltage power is applied, an electrostatic repulsive force is generated between the surface modification layer and organic particles in the raw water; and
   in the second process mode, as the high voltage power is applied, a radical is generated, and the organic particles in the raw water is oxidized by the radical.

2. The electrochemical membrane degassing apparatus of claim 1, wherein, in the second process mode, as the high voltage power is applied, microbubbles are generated in the surface modification layer and thus matter absorbed by at least one of the surface modification layer and the gas separation membrane is removed.

3. The electrochemical membrane degassing apparatus of claim 2, wherein the surface modification layer is made of one of or a combination of at least two or more of a conductive carbon-based material, metal-organic frameworks, and conductive polymers.

4. The electrochemical membrane degassing apparatus of claim 3, wherein the carbon-based material includes one of or a combination of at least two or more of activated carbon, carbon nanotubes, and graphene.

5. The electrochemical membrane degassing apparatus of claim 2, wherein, in the second process mode, the radical is generated by an ionic substance in the raw water.

6. The electrochemical membrane degassing apparatus of claim 2, wherein, in the second process mode, a gaseous by-product generated in a process of oxidation of the organic particles passes through the gas separation membrane to be moved to the gaseous channel.

\* \* \* \* \*